United States Patent [19]

Doyle

[11] Patent Number: 5,010,933
[45] Date of Patent: Apr. 30, 1991

[54] LOG SKIDDING VEHICLE

[76] Inventor: James R. Doyle, G12-378 Lake Street, Sault Ste. Marie, Ontario, Canada, P6B 3K9

[21] Appl. No.: 535,068

[22] Filed: Jun. 8, 1990

[51] Int. Cl.$^5$ .................... A01G 23/08; B60P 1/04
[52] U.S. Cl. .................... 144/336; 144/3 D; 144/34 B; 254/326; 414/559; 414/469
[58] Field of Search ............. 414/23, 559, 426, 469, 414/569, 619, 787; 144/3 D, 34 A, 34 B, 34 R, 335, 336, 343; 212/255, 260, 261; 254/326

[56] References Cited

U.S. PATENT DOCUMENTS

| | | | |
|---|---|---|---|
| 1,874,007 | 8/1932 | Heaton | 414/469 |
| 1,909,689 | 5/1933 | Kuchar | 414/469 |
| 3,537,604 | 11/1970 | Whisler | 144/2 Z |
| 3,576,202 | 4/1971 | Spanjer | 144/3 D |
| 3,576,266 | 4/1971 | Widley | 414/569 |
| 3,627,003 | 12/1971 | Kessler | 144/3 D |
| 3,630,243 | 12/1971 | Hamilton | 144/3 D |
| 3,741,526 | 6/1973 | Kasin et al. | 414/559 |
| 3,856,060 | 12/1974 | Savage et al. | 144/34 B |
| 3,976,210 | 8/1976 | Allen | 414/559 |
| 4,148,526 | 4/1979 | Kurelek | 144/3 D |
| 4,278,392 | 7/1981 | Meisel, Jr. | 254/326 |

Primary Examiner—W. Donald Bray
Attorney, Agent, or Firm—Ridout & Maybee

[57] ABSTRACT

A vehicle is provided for skidding timber. Conventional skidders are generally large tracked or rubber tired vehicles having a fixed frame to which a towing cable is attached. The cable load applied to such skidders is rearward of the rear wheels tending to reduce the load on the front wheels and increase the load on the rear wheels. A vehicle in accordance with the invention includes a frame pivotally mounted upon the vehicle's chassis. A cable sheave is mounted upon the outer end of the frame and a towing cable reeved over the sheave with a cable winch attached to the forward end of the cable. Attachment means secure logs to the end of the cable. Abutment means connected to the outer end of the frame engage the attachment means as the cable and log are drawn forwardly by the winch. When the attachment and abutment means engage further winching in of the cable rotates the frame from a rearward position to a forward position. In the rearward position, the cable sheave is rearward of the vehicle's rear wheels. In the forward position, the cable sheave is forward of the vehicle's rear wheels. The load applied by the cable to the vehicle in the forward position is more evenly distributed between the forward and rearward wheels thereby improving vehicular traction, reducing rutting of roadways and lessening the tendency of the front wheels to lift from the roadway. Therefore the method and vehicle ensure that the forest may be renewed in perpetuity providing parkland, wildlife habitat and other benefits of nature while also providing employment and forest products in an economically viable quantity.

13 Claims, 4 Drawing Sheets

LOG SKIDDING VEHICLE

TECHNICAL FIELD

The invention is directed to vehicles for skidding logs or dragging full length tree stems behind a skidder vehicle during logging operations.

BACKGROUND ART

During logging operations, trees are felled, lateral branches trimmed and the top portions removed to produce logs of desired size. A rubber tired or tracked skidder vehicle having a cable winch is used to assemble logs into a bundle and to drag the bundle to a loading area. The logs are attached to a cable generally by chokers looped about the logs or tree trunk and engaged on a sliding bell hook at the rearward end of the main line cable. A cable winch at the forward end of the cable draws the logs forwardly to an area adjacent the rear of the skidder. Bundles are assembled and dragged behind the skidder to a landing area where the logs are loaded upon trucks for transport to a saw-mill or paper mill.

An ecologically destructive method of logging known as "clear-cut logging" is generally used in the belief that it is economically preferable to other methods. In clear-cut logging, all trees in a forest are felled regardless of size but only trees of a desired size and type are actually used to produce logs. Undersized or defective trees which do not meet the desired criterion are felled solely to remove obstacles to the logging operation and are left to rot on the former forest floor.

Conventional skidders are often earth moving vehicles converted for logging operations by installing a cable winch and a fixed frame with a cable sheave on the rear portion of the skidder. Such skidders are large heavy machines which require relatively wide access paths and open areas in which to turn and manoeuvre. A common practice in operating such skidders is to attach chokers to a number of tree stems or logs and then simultaneously draw all the logs toward the skidder with a single cable. Each choker is attached to a sliding bell hook at the end of the main line cable and all logs are drawn together from their individual positions in a fan-like configuration which is called a gathering operation. Such operations require that obstacles be removed in the path of the logs as they are drawn and slide along the forest floor toward the skidder. To reduce handling costs therefore clear cutting is used. Logs are removed from where they have fallen and drawn into a bundle for dragging to a loading area in a single operation. It is generally believed by those practicing clear cut logging that clear cut logging is the most profitable method of harvesting mature trees. Such an approach is becoming increasingly unacceptable due to long term or permanent ecological damage.

Use of such large and heavy conventional skidders is necessary when large numbers of logs are both drawn and dragged by a single skidder. In addition to requiring open areas to operate, conventional skidders tend to cause deep ruts in the forest floor due to excessive machine and load weight. The ruts speed erosion by providing channels for runoff water.

Since logs are dragged behind such skidders, the frictional force of the logs dragging on the forest floor increases the tractive effort required. In most cases, conventional skidders have a fixed arch frame which extends rearward of the skidder's rear axle and wheels. The arch frame supports a cable sheave upon which the cable is reeved. The tensile force exerted by the cable upon the arch frame creates a turning moment which tends to increase the bearing load pressure upon the rear wheels while decreasing the bearing load upon the front wheels. The turning moment may lift the front wheels from the forest floor in many cases reducing operator control and subjecting the skidder to damage. The rear wheels under such heavy loads may form deep ruts and may bog down in soft soil. Spinning wheels when traction is inadequate results in further rutting.

Ecologically clear cut logging has catastrophic consequences. A clear cut area quickly erodes since the forest cover no longer protects the soil and root structures from rain and wind erosion nor from drying in the sun. The rutting caused by conventional skidders creates channels for pooling and runoff of water further aiding erosion. Many forest trees and plants require full or partial shade especially in their early stages of growth. Clear cutting exposes such immature trees to direct sunlight thereby impeding their growth and encouraging other types of vegetation such as scrub to grow. The nature of the forest is immediately and radically altered removing wildlife habitat and imposing a harsh environment which delays or prevents forest regeneration. Streams and rivers having increased silt and particle concentrations from soil erosion become inhospitable to wildlife whose numbers decrease as a result.

Efforts at reforestation have met with limited success for a number of reasons. Clear cutting removes the optimal environment for growth of immature trees which require partial shade and protection from wind. The erosion due to clear cutting is so rapid that critical top soil may be lost before replanted trees develop root structures adequate to maintain the soil's integrity. Reforestation requires extensive organization and capital expenditures since it is labour intensive in remote areas. Governments have generally not demonstrated an unwavering commitment to impose mandatory reforestation since maintaining employment in areas dependent upon the forestry industry is a major political concern.

In days long past, individuals trees were harvested as they matured. Horses were used to skid logs from the dense forest to a river, landing, portable saw-mills, or an access road cut through the forest. Logs were loaded upon sleds or trucks, or floated down rivers to sawmills. Although such methods result in less ecological damage and a sustainable renewable forest resource, modern clear cutting methods are preferred since it is widely believed that no other methods or equipment can produce logs in a cost efficient and profitable manner.

Such short term approaches ignore the cost of ecological damage and the benefits of a renewable forest resource. Clear cutting forces logging operations to continually seek new territories to exploit and to abandon the clear-cut logged area for an indeterminate period until the area is naturally regenerated or is reforested by man.

The invention addresses the foregoing disadvantages of conventional methods and vehicles for skidding timber through the use of a selective tree harvesting method and a novel vehicle.

In accordance with one aspect of the invention, a method is proposed wherein only trees of a selected size are felled and removed from the forest as logs. The surrounding trees which are too immature to be harvested or are defective in some manner or not of a desired species are left standing. A sustainable renewable forest resource is maintained since only access paths and roads of a minimal width need be cut through the forest in order to gain access to the selected trees. As trees mature, they may be harvested using the same paths and roads previously cut.

In accordance with a second aspect of the invention, a compact vehicle is proposed for skidding timber. The compact vehicle may be constructed in practice to be of weight no more than 4 tons (3600 kg.), with a maximum velocity capability of 10 m.p.h. (16 kph) and a naturally aspirated diesel engine of under 45 h.p. This vehicle is relatively small in comparison to conventional skidders as described above and is capable of weaving along a narrow path through the forest. As a result of the novel design of the vehicle, a relatively narrow path may be cut which winds around immature trees, thereby avoiding the necessity of cutting down any more trees than is absolutely necessary for access, and transport of the logs. The vehicle is used therefore, to drag logs out of the dense forest to access roads where conventional larger skidders then operate in conventional manner dragging logs to truck transport. The major portion of the forest is left relatively undisturbed as a result therefore, and may remain as a renewable forest in perpetuity.

DISCLOSURE OF THE INVENTION

In accordance with the invention, a vehicle is provided for skidding timber comprising: a frame having inner and outer ends, said frame pivotally mounted at its inner end to a rearward portion of said vehicle's chassis for rotation about a horizontal axis transverse to the vehicle's longitudinal axis between a forward and a rearward position; a cable sheave pivotally mounted to said outer end of said frame for rotation about a transverse sheave axis; a cable winch connected to said chassis forward of the inner end of said frame; a cable, the forward end of which engages said cable winch, said cable being reeved over said cable sheave; attachment means, connected to the rearward end of said cable, for securing at least one log to said cable; and abutment means, connected to said outer end of said frame outward of said cable sheave, for engaging said attachment means as said cable and log are drawn forwardly by said winch to rotate said frame from said rearward position, to said forward position, whereby the load exerted by said cable upon said vehicle is applied forward of the rear wheels of said vehicle when said frame is in a forward position.

Although such a vehicle may be constructed of any size, as will be described in detail below, a relatively small vehicle having limited capacity is preferred in order that the vehicle may manoeuvre around trees within a forest. Utilizing such a vehicle, only selected mature trees need be harvested since the relatively small light vehicle requires a path of minimal width sufficient to accommodate the vehicle. In addition, a smaller vehicle does not cause the severe rutting associated with heavier conventional vehicles and the forest may recover quickly overgrowing the path without significant erosion or permanent damage to the ecosystem.

Also in accordance with the invention is provided a method of selectively harvesting trees, utilizing a novel vehicle as described above, comprising: clearing a path of minimum width sufficient to accommodate said vehicle; felling and trimming trees of a selected size range; individually securing said attaching means to the trunk of each felled tree; individually drawing each felled tree forwardly with said winch to an area adjacent said path; securing said attaching means to a plurality of felled trees in a bundle adjacent said path; dragging said bundle behind said vehicle to an area adjacent a first access road; securing a plurality of said bundles to a log skidder having a load capacity significantly greater than that of said vehicle; dragging said plurality of bundles to an area adjacent a second access road; loading said felled trees upon a truck; and transporting said trees by truck along said second access road.

When a vehicle and logging method as described herein are utilized, only selected trees need be harvested leaving the remainder of the forest to develop naturally. Large conventional skidders are still used on access roads but the major portion of the forest is left relatively undamaged since only minimal paths need be cut for access of vehicles in accordance with the invention. Such paths are not severely rutted and quickly recover. The paths therefore do not impose the severe consequences of conventional large equipment and clear cutting. Immature trees may be left standing until they grow to a mature size for harvesting. The forest naturally regenerates eliminating the need for reforestation and significantly reducing erosion. Of course if desired reforestation of selectively forested areas may also be undertaken to aid recovery of the forest.

The vehicle is designed to reduce rutting and more evenly balance the loads upon the vehicle's wheels to improve traction. Although the number of logs capable of being dragged at one time by such a vehicle is significantly lower than a conventional skidder, the rate of production using such novel vehicles and method, in terms of board feet of timber per man day need not be compromised and is believed to be equal to or greater than the rate of production using conventional methods and skidders. Utilizing the method and vehicle described herein labour time may be saved since immature and defective trees need not be felled except to cut a vehicle path. The vehicle is relatively small and may quickly turn about and shuttle between the dense forest and the access road.

The benefits involved in maintaining a renewable forest resource are difficult to quantify especially in ecological terms. Economically, however, the viability of long term continued clear cutting is doubtful as mature harvestable forests become more and more remote from transportation facilities and markets. Sustainable management of renewable natural resources is generally recognized as the ultimate objective of planners in fisheries, wildlife and forestry management.

BRIEF DESCRIPTION OF THE DRAWINGS

In order that the invention may be readily understood, one embodiment of the invention will be described by way of example with reference to the attached drawings.

FIG. 4 is a view along lines 4—4 of FIG. 1 showing the outer end of the abutment means.

BEST MODE OF CARRYING OUT THE INVENTION

Figure 1:
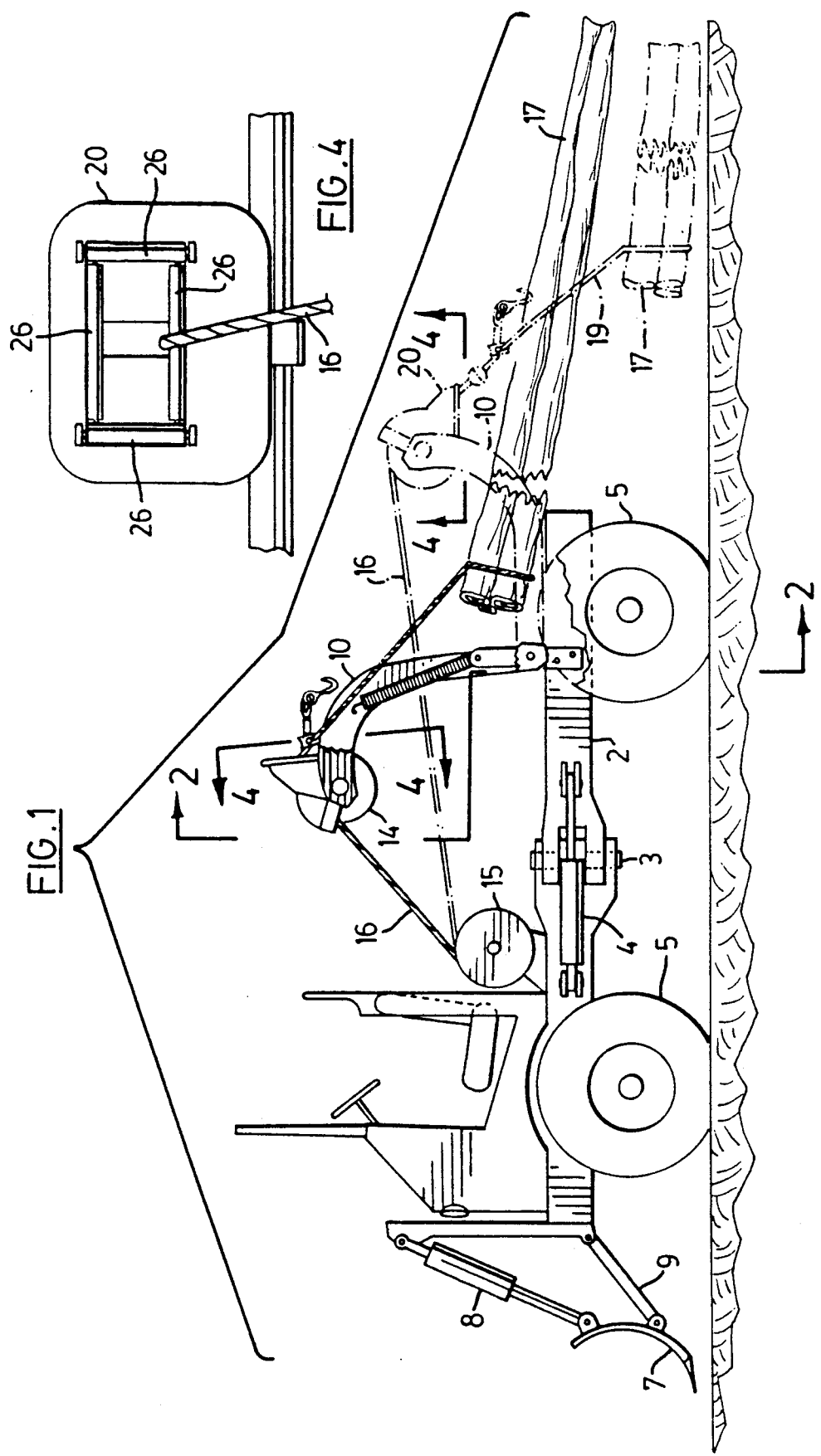
FIG. 1 is an elevation view of a vehicle according to the invention showing the frame in its forward position in solid lines, and in the rearward position shown in dotted outline.
Figure 2:
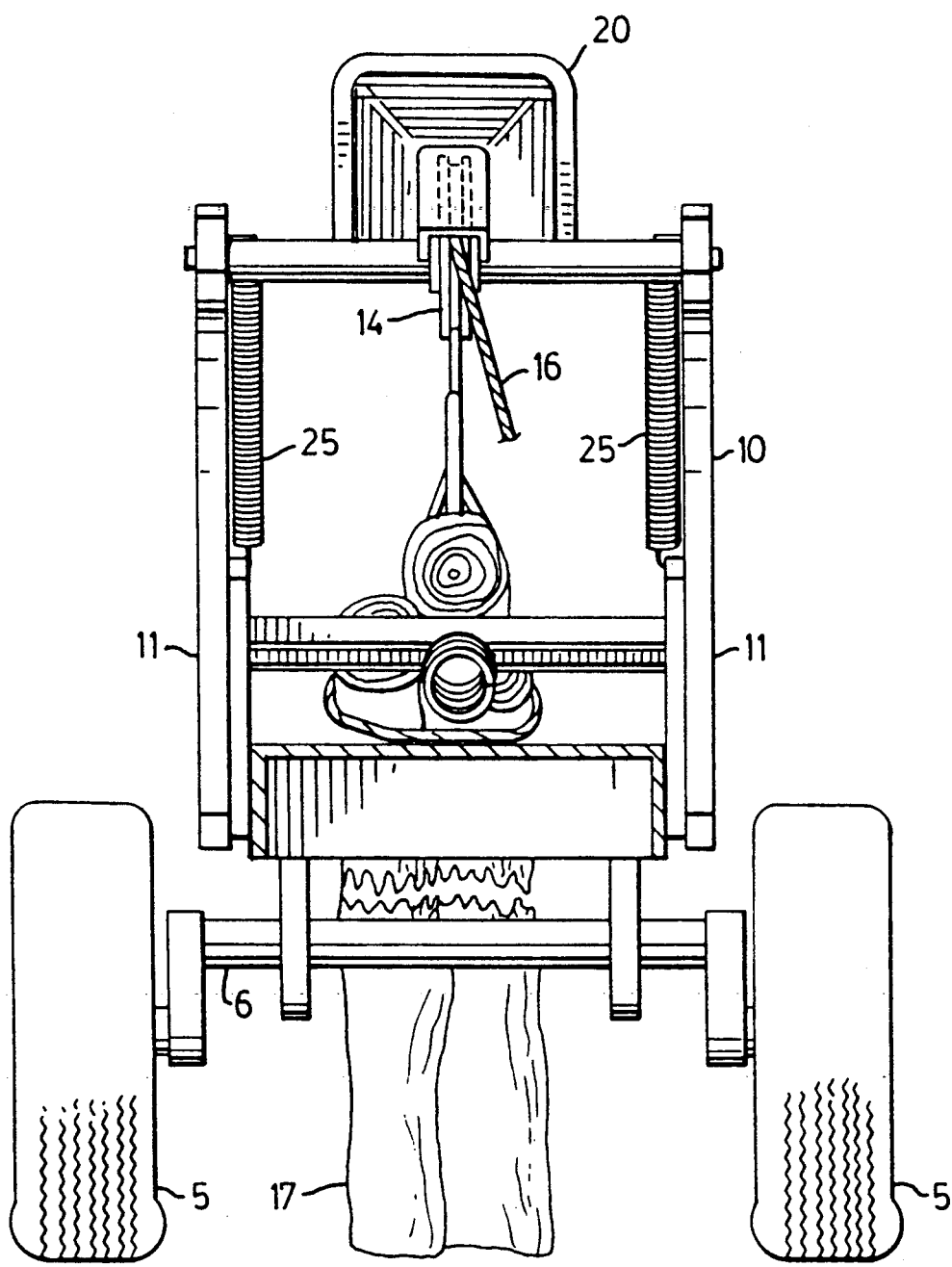
FIG. 2 is sectional view along lines 2—2 of FIG. 1.

Referring to FIG. 1, a vehicle in accordance with a preferred embodiment is an articulated four wheel drive rubber tired vehicle. A truck such as a Unimog* (made by Mercedes-Benz) may be modified by separating the chassis into a forward chassis section 1 and a rearward chassis section 2. A hinge 3 pivotally connects the forward and rearward sections 1 and 2 for rotation about a vertical axis transverse to the vehicle's longitudinal axis. Articulating steering means such as hydraulic cylinders 4 mounted between the forward and rearward sections 1 and 2 are provided for rotating the sections relative to each other about the hinge 3.
* Trade-mark The wheels 5 of the vehicle are driven in pairs by a forward and a rearward upwardly offset transverse axle 6 as best illustrated in FIG. 2. The axle configuration aids in avoiding stumps and other obstacles, has more clearance for use in snow or swamp areas or when crossing shallow streams if necessary.

The forward end of the vehicle is provided with a dozer blade 7 and means to raise and lower the blade 7 for clearing a path. Such means are shown as a hydraulic or air cylinder 8 and linkage arm 9 in FIG. 1.

Figure 3:
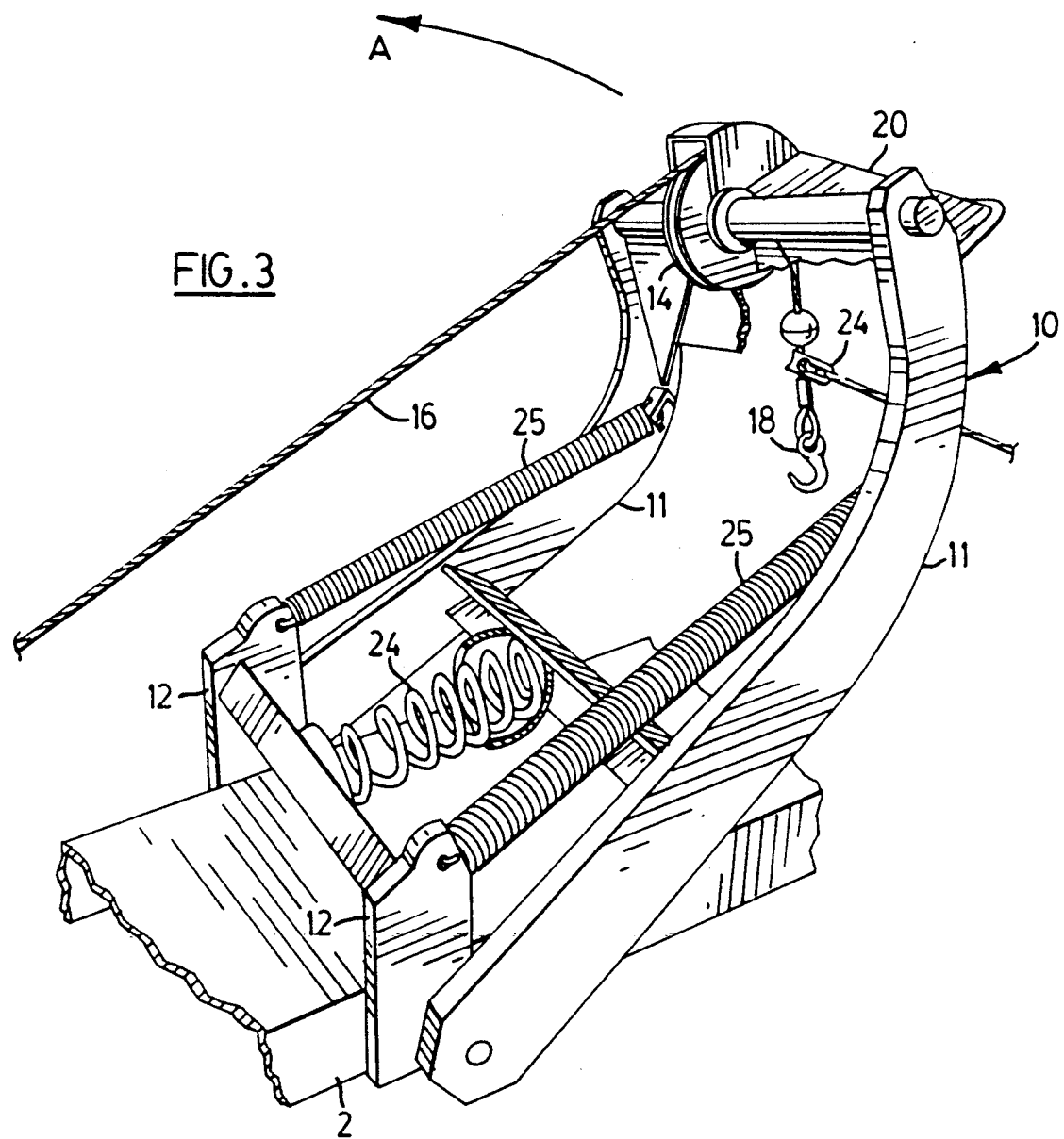
FIG. 3 is perspective view of the frame, having the abutment means partially broken away to show the sheave.

Referring to FIG. 3, the vehicle includes a frame 10 pivotally mounted to the rearward portion 2 of the vehicle's chassis. The frame 10 is constructed of two parallel arms 11 pivotally connected at their inner ends to a pair of brackets 12 fixed to the chassis. At the outer ends of the arms 11 is a rod 13 upon which a cable sheave 14 is pivotally mounted for rotation about a transverse sheave axis. The frame 10 is pivotally mounted to the chassis for rotation about a horizontal axis transverse to the vehicle's longitudinal axis as indicated by arrow A, between a forward and a rearward position as shown in FIG. 1.

A cable winch 15 is connected to the chassis forward of the inner end of the frame 10. A cable 16 has its forward end engaging the cable winch 15 and is reeved over the cable sheave 14.

Attachment means are connected to the rearward end of the cable 16 for securing at least one log 17 to the cable 16. Attachment means may include a sliding bell hook 24 and a hook 18 attached to the cable 16 and at least one choker 19 looped about the log or logs 17. A conventional sliding bell hook 24 is used to secure the choker 19 to the cable 16. The open hook 18 is used in towing a vehicle or pulling a stump.

Figure 5:
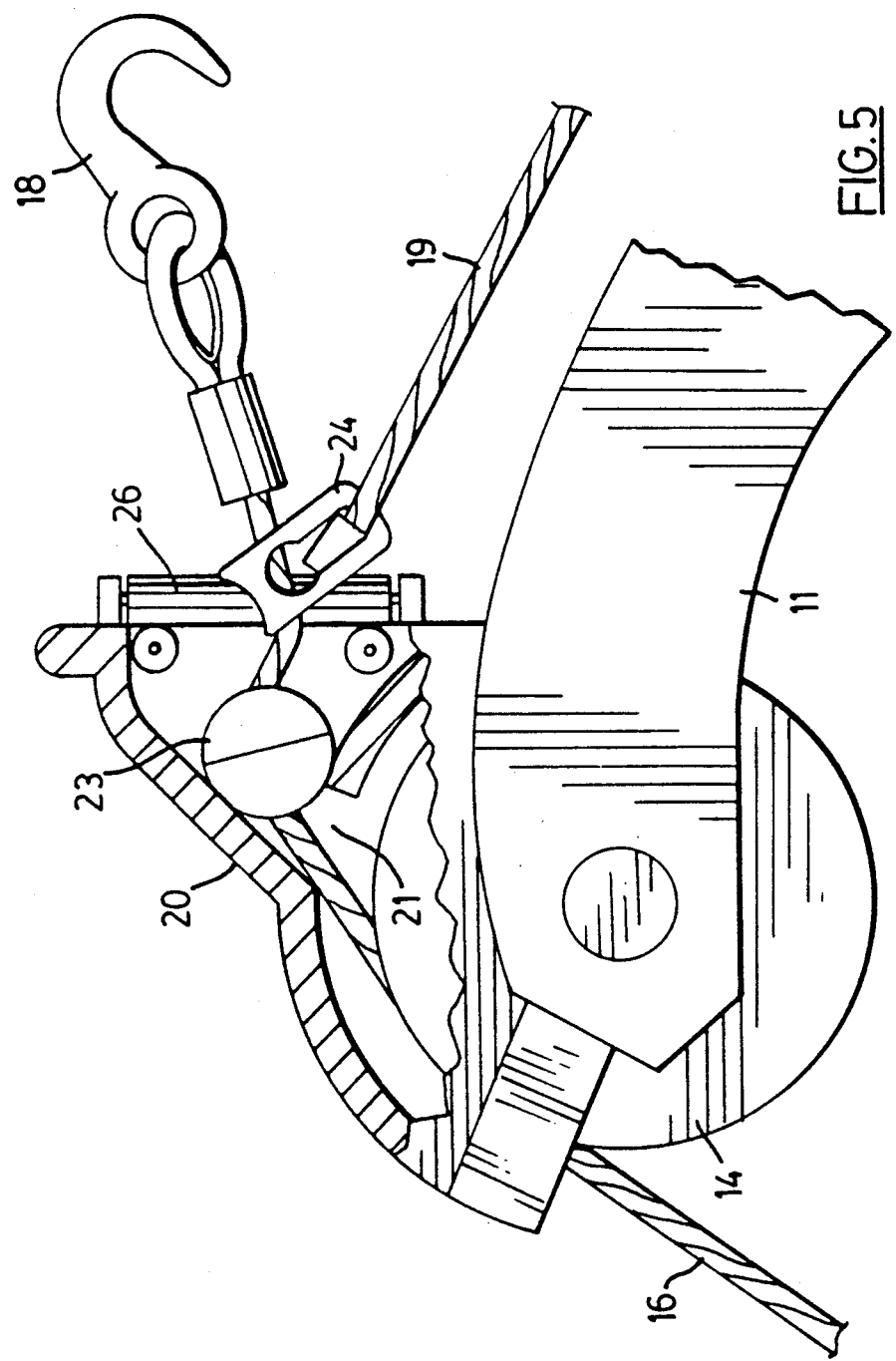
FIG. 5 is a detail section of the abutment means.

Referring to FIG. 5, abutment means are connected to the outer end of the frame 10 outward of the cable sheave 14. The abutment means may be constructed as a funnel shaped abutment 20 having an open narrow inner end 21 through which the cable 16 extends and a wide outer end 22. The attachment means may include a drilled solid steel slip ball 23 about the cable 16 that slides immediately forward of the hook 18. As the cable 16 and attached logs 17 are drawn forwardly with the frame 10 in the rearward position (shown in dotted outline in FIG. 1) the ball 23 engages the abutment 20. The ball 23 has a transverse dimension greater than that of the narrow inner end 21 of the abutment 20 and lodges in the inner end 21. Further winching in of the cable 16 causes the frame 10 to rotate from the rearward position to the forward position (shown in solid lines in FIG. 1) in the direction of arrow A. The load exerted by the cable 16 upon the vehicle is applied forward of the rear wheels 5 when the frame is in a forward position.

The result of shifting the cable load forward between the forward and rearward wheels is to distribute the weight of the logs between the wheels 5. Traction improves and the tendency of the front wheels to lift is reduced. The vehicle is therefore more stable and caused less rutting than conventional skidders, and provides continuous tractive effort upon both front and rear axles and wheels.

Referring to FIG. 3, a compression or "kicker" spring 24 is located between a movable cross member of the frame 10 and chassis 2 for dampening the propagation of dynamic loads as the frame 10 is forwardly rotated in the direction of arrow A. Tensile springs 25 span between the frame 10 and brackets 12 on the chassis 2 for dampening the propagation of dynamic loads as the frame 10 is rearwardly rotated, and prevents impact from the frame 10 upon the rear of the chassis 2.

The outer end of the abutment 20 may include rollers 26 for reducing friction and abrasion between the cable 16 and the abutment 20.

In operation of the vehicle using the method of the invention therefore, the following sequence is followed. Selective harvesting of trees may be carried out using a vehicle described above by initially clearing a path with the dozer blade 7 and a chainsaw if necessary. The path need only be of minimum width sufficient to accommodate the vehicle. Since the vehicle has articulated steering its turning radius is reduced. Trees of a selected size range only are felled and trimmed. All other immature trees and scrub are left standing although in felling the tree and drawing it out of the forest. Some minimal damage still occurs but the forest is capable of recovering quickly. A choker 19 is attached to the trunk of the felled tree individually securing it to the cable 16. Each felled tree is individually drawn forwardly with the winch 15 to an area adjacent the rear of the skidder on the path. In this stage, the frame 10 remains in its rearward position. When a group of felled trees is accumulated, the trees are formed into a bundle and secured with one choker about the bundle or with a choker about each tree individually. The bundle is of size and weight approximately equal to the vehicle's capacity which is significantly less than the capacity of a conventional skidder.

With the frame in its rearward position, the cable 16 is winched forwardly until the ball 23 lodges in the abutment 20 as described above. Further winching in of the cable 16 rotates the frame 10 from the rearward position to the forward position. The forward end of the bundle of logs 17 is suspended above the extreme rearward portion of the vehicle as shown in FIG. 1.

The bundle is dragged behind the vehicle to an area adjacent a first access road.

A number of small skidder vehicles travelling on such narrow paths in the forest feed bundles to the first access road upon which a conventional larger skidder operates. A plurality of bundles is secured in the conventional manner to a conventional log skidder having a load capacity significantly greater than that of the vehicles. The conventional skidder drags the plurality of bundles to an area adjacent a second access road. The second access road is suitable for truck traffic. The logs are loaded upon trucks and transported along the second access road to sawmills, railroad siding, or paper mills in a conventional manner.

I claim:

1. A vehicle having a chassis for skidding timber comprising:
   a frame having inner and outer ends, said frame pivotally mounted at its inner end to a rearward portion of said chassis for rotation about a horizontal axis transverse to the vehicle's longitudinal axis between a forward and a rearward position;
   a cable sheave pivotally mounted to said outer end of said frame for rotation about a transverse sheave axis;
   a cable winch connected to said chassis forward of the inner end of said frame;
   a cable, the forward end of which engages said cable winch, said cable being reeved over said cable sheave;
   attachment means, connected to the rearward end of said cable, for securing at least one log to said cable; and
   abutment means, connected to said outer end of said frame outward of said cable sheave, for engaging said attachment means as said cable and log are drawn forwardly by said winch to rotate said frame from said rearward position, to said forward position, whereby the load exerted by said cable upon said vehicle is applied forward of the rear wheels of said vehicle when said frame is in a forward position.

2. A vehicle according to claim 1 further comprising:
   compression spring means between said frame and said chassis for dampening the propagation of dynamic loads as said frame is forwardly rotated.

3. A vehicle according to claim 1 further comprising:
   tensile spring means between said frame and said chassis for dampening the propagation of dynamic loads as said frame is rearwardly rotated.

4. A vehicle according to claim 1 wherein said abutment means comprise a funnel-shaped abutment having an open narrow inner end through which said cable extends and a wide outer end, said narrow inner end having an opening of transverse dimension smaller than that of said attachment means.

5. A vehicle according to claim 4 wherein said outer end of said abutment includes roller means for reducing friction and abrasion between said cable and said abutment.

6. A vehicle according to claim 1 wherein said attachment means comprises a hook attached to said cable and at least one choker looped about said at least one log and engaging said hook.

7. A vehicle according to claim 6 wherein said attachment means includes a steel split ball fixed about said cable immediately forward of said hook.

8. A vehicle according to claim 1 comprising:
   a forward chassis section;
   a rearward chassis section;
   a hinge pivotally connecting said forward and rearward sections for rotation about a vertical axis transverse to the vehicle's longitudinal axis; and
   articulating steering means for rotating said forward and rearward sections relative to each other.

9. A vehicle according to claim 1 including four driven rubber tired wheels.

10. A vehicle according to claim 9 wherein said wheels are driven in pairs by a forward and a rearward upwardly offset transverse axle.

11. A vehicle according to claim 1 including a dozer blade attached to the forward end of said vehicle and means to raise and lower said blade for clearing a path.

12. A method of selectively harvesting trees, utilizing a vehicle according to claim 1, comprising:
   clearing a path of minimum width sufficient to accommodate said vehicle;
   felling and trimming trees of a selected size range;
   individually securing said attaching means to the trunk of each felled tree;
   individually drawing each felled tree forwardly with said winch to an area adjacent said path;
   securing said attaching means to a plurality of felled trees in a bundle adjacent said path;
   dragging said bundle behind said vehicle to an area adjacent a first access road;
   securing a plurality of said bundles to a log skidder having a load capacity significantly greater than that of said vehicle;
   dragging said plurality of bundles to an area adjacent a second access road;
   loading said felled trees upon a truck; and
   transporting said trees by truck along said second access road.

13. A method according to claim 12 including the step of aligning the longitudinal axis of said vehicle along the route upon which said felled trees are individually drawn whereby damage to adjacent trees is minimized.

* * * * *